United States Patent
Gil et al.

(10) Patent No.: US 7,746,991 B2
(45) Date of Patent: Jun. 29, 2010

(54) APPARATUS AND METHOD OF PROVIDING A CALL SERVICE USING A PREPAID CARD IN A PORTABLE TERMINAL

(75) Inventors: Yong-Seok Gil, Gumi-si (KR); Seung-Chul Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/099,601

(22) Filed: Apr. 6, 2005

(65) Prior Publication Data

US 2006/0045247 A1  Mar. 2, 2006

(30) Foreign Application Priority Data

Sep. 1, 2004  (KR) ...................... 10-2004-0069579

(51) Int. Cl.
*H04M 15/00*  (2006.01)
(52) U.S. Cl. ..................... 379/114.2; 455/406; 455/408
(58) Field of Classification Search ......... 455/405–408; 379/114.2, 144.01, 144.04, 144.06; 348/14.01
See application file for complete search history.

(56) References Cited

U.S. PATENT DOCUMENTS

| | | | |
|---|---|---|---|
| 5,550,897 A * | 8/1996 | Seiderman ................ 455/558 |
| H1714 H * | 3/1998 | Partridge, III ............ 348/14.01 |
| 5,729,591 A * | 3/1998 | Bailey ........................ 455/558 |
| 6,947,571 B1 * | 9/2005 | Rhoads et al. .............. 382/100 |
| 7,174,031 B2 * | 2/2007 | Rhoads et al. .............. 382/107 |
| 7,406,214 B2 * | 7/2008 | Rhoads et al. .............. 382/289 |
| 2004/0022237 A1 * | 2/2004 | Elliott et al. ................ 370/356 |
| 2004/0204082 A1 * | 10/2004 | Abeyta ....................... 455/557 |
| 2005/0098633 A1 * | 5/2005 | Poloniewicz et al. ... 235/462.14 |
| 2005/0129282 A1 * | 6/2005 | O'Doherty et al. ......... 382/112 |
| 2006/0007325 A1 * | 1/2006 | Suzuki .................. 348/231.99 |
| 2008/0014917 A1 * | 1/2008 | Rhoads et al. ........... 455/422.1 |
| 2008/0141117 A1 * | 6/2008 | King et al. .................. 715/238 |

FOREIGN PATENT DOCUMENTS

JP   2003-101677   4/2003

* cited by examiner

*Primary Examiner*—Binh K Tieu
(74) *Attorney, Agent, or Firm*—Roylance, Abrams, Berdo & Goodman, L.L.P.

(57) ABSTRACT

An apparatus and method of providing a call service using a prepaid card in a portable terminal is provided. The prepaid card is photographed according to a predetermined prepaid card capturing mode operation, and a unique prepaid card number is recognized from the photographed image and stored. A phone number is received and the prepaid card number and the phone number are dialed.

12 Claims, 4 Drawing Sheets

APPARATUS AND METHOD OF PROVIDING A CALL SERVICE USING A PREPAID CARD IN A PORTABLE TERMINAL

PRIORITY

This application claims the benefit under 35 U.S.C. §119 (a) to an application entitled "Method of Providing Call Service Using Prepaid Card in a Portable Terminal" filed in the Korean Intellectual Property Office on Sep. 1, 2004 and assigned Serial No. 2004-69579, the entire contents of which are incorporated herein by reference.

BACKGROUND OF THE INVENTION

1. Field of the Invention

The present invention relates generally to an apparatus and method of providing a call service in a portable terminal. In particular, the present invention relates to an apparatus and method of storing the unique number of a prepaid card via character recognition and providing a call service using the prepaid card number.

2. Description of the Related Art

A prepaid card refers to a card having a unique registered number for which the amount of money and a validity period are specified so that a user can call with the card up to the amount for the specified period. To make calls using the prepaid card, the user dials an access number (e.g. 00721) to access a switching center. After this primary connection, the switching center requests the prepaid card number through Automatic Response Service (ARS). The user then dials the prepaid card number (e.g. 2341007810) by pressing buttons. The switching center detects the card number and then requests a phone number to be called through ARS. When the user dials the phone number, the switching center attempts to connect a call.

The above-described conventional prepaid card phone service is a manual dialing scheme in which the access number is dialed to access the switching center, the prepaid card number is dialed for authentication in the switching center, and then the called number is dialed. Therefore, a lot of time is consumed to call and, inconveniently, dialing the called number using hot key dialing (and redialing) or a number table like a phonebook is not available.

SUMMARY OF THE INVENTION

An object of the present invention is to substantially solve at least the above problems and/or disadvantages and to provide at least the advantages below. Accordingly, an object of the present invention is to provide an apparatus and method of providing a call service using a prepaid card through a simple key manipulation with less key pressings in a portable terminal.

The above object is achieved by providing an apparatus and method of providing a call service using a prepaid card in a portable terminal. The prepaid card is photographed according to a predetermined prepaid card capturing mode operation, and a unique prepaid card number is recognized from the photographed image and stored. A phone number is received and the prepaid card number and the phone number are dialed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described herein below with reference to the accompanying drawings. In the following description, well-known functions or constructions are not described in detail for conciseness.

Figure 1:
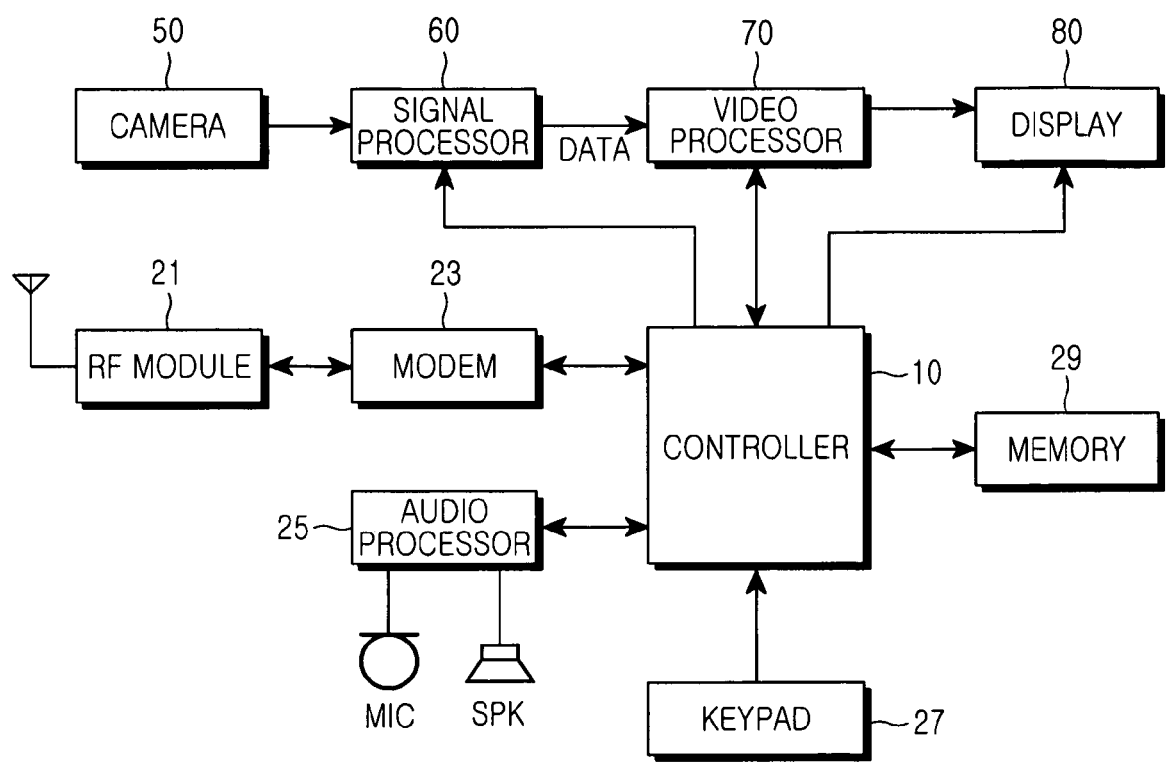
FIG. 1 is a block diagram of a portable terminal according to an embodiment of the present invention.

FIG. 1 is a block diagram of a portable terminal according to the embodiment of the present invention. Referring to FIG. 1, a Radio Frequency (RF) module 21 controls communications in the portable terminal. It includes an RF transmitter (not shown) for upconverting and amplifying a transmission signal and an RF receiver (not shown) for low-noise amplifying downconverting a received signal.

A MODEM 23 is provided with a transmitter for encoding and modulating the transmission signal and a receiver for demodulating and decoding the received signal.

An audio processor 25 may have a CODEC. The CODEC includes a data CODEC for processing packet data and an audio CODEC for processing an audio signal including voice. The audio processor 25 converts a digital audio signal received from the MODEM 23 to an analog signal through the audio CODEC prior to reproduction, or converts an analog audio signal generated from a microphone (MIC) to a digital audio signal and transmits it to the MODEM 23. The CODEC may be procured separately or incorporated into a controller 10.

A keypad 27 includes alphanumerical keys for entering digits and characters, and function keys for invoking functions. According to the embodiment of the present invention, the keypad 27 can be provided with function keys for a call service using a prepaid card. For example, a prepaid card phone service mode can be set or released by pressing a predetermined key, and the keypad 27 may have hot keys for hot key dialing.

A memory 29 may be configured to include a program memory and a data memory. The program memory stores programs for controlling the operations of the portable terminal. The data memory temporarily stores data generated during execution of the programs. According to the embodiment of the present invention, the program memory stores a character recognition program and a prepaid card phone service program. The data memory stores the unique number of a prepaid card by character recognition and country codes, and phone numbers in a number table such as a table of hot key numbers and a phone book.

The controller 10 provides overall control to the portable terminal. The controller 10 performs a character recognition mode operation upon input of a character recognition mode key, and stores the prepaid card number captured in the character recognition mode according to the embodiment of the present invention. Upon input of a prepaid card phone service mode key, the controller 10 displays call service types and attempts a "domestic", "domestic to overseas", "overseas to domestic", or "overseas to overseas" call according to a selected call service type. When receiving the prepaid card number, the controller 10 awaits reception of a called number. The controller 10 may include the MODEM 23.

A camera 50 captures an image. It includes a camera sensor for converting the captured optical signal to an electrical signal. The camera sensor can be a Charge Coupled Device (CCD) sensor.

A signal processor 60 converts the video signal received form the camera to an image signal. The signal processor 60 can be implemented as a Digital Signal Processor (DSP). A video processor 70 generates video data for displaying the video signal received from the signal processor 60.

The video processor 70 transmits a video signal received under the control of the controller 10 in a form suitable for a display 80 and compresses/decompresses the video data. The video processor 70 also transmits the start address of the video data to be output to the display 80, or changes the start address under the control of the controller 10.

The display 80 displays the video data received from the video processor 70. The display 80 may comprise a Liquid Crystal Display (LCD). In this case, the display 80 includes a LCD controller, a memory for storing video data, and a LCD device. If the LCD is implemented in a touch screen manner, the keypad 27 and the LCD collectively form an input portion.

In operation, when the user dials through the keypad 27 and sets an origination mode, the controller 10 detects it, processes received dialed information through MODEM 23, and converts the processed information to an RF signal through the RF module 21 prior to transmission. Upon generation of a response signal from a called party, the controller 10 detects it through the RF module 21 and the MODEM 23. A voice communication path is then established through the audio processor 25 so that the user can converse. In a termination mode, the controller 10 detects the termination mode through the MODEM 23 and generates a ring signal through the audio processor 25. When the user answers, the controller 10 detects the answer and establishes the voice communication path through the audio processor 25 so that the user can converse. While the origination and termination modes have been described in relation to a voice call, they can also be applied in the same manner to data communication including packet data and video data. In an idle mode or in text communications, the controller 10 displays text data processed by the MODEM 23 on the display 80.

A prepaid card phone service in the portable terminal according to the present invention will be described below with reference to FIG. 1. In operation, when the user presses a key designated for setting a character recognition mode (a character recognition mode key) and photographs the unique number of the prepaid card, the controller 10 controls the memory 29 to store the prepaid card number. Upon input of a key designated for the prepaid card phone service mode (a prepaid card phone service mode key) from the user through the keypad 27, the controller 10 displays the memory 29 and the display 80 to display call service types and attempts a "domestic", "domestic to overseas", "overseas to domestic", or "overseas to overseas" call according to user selection.

Figure 2:
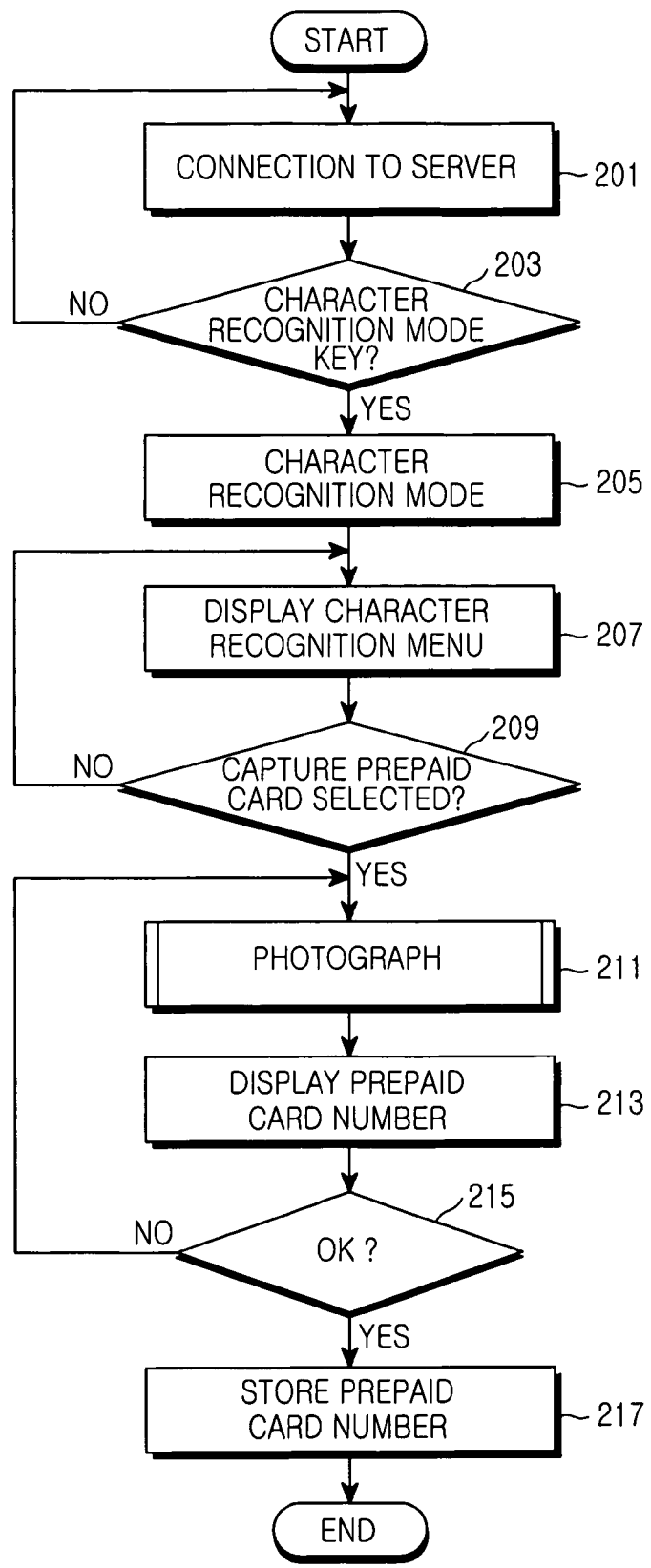
FIG. 2 is a flowchart illustrating operations for storing the unique number of a prepaid card using character recognition according to the embodiment of the present invention.
Figure 4:
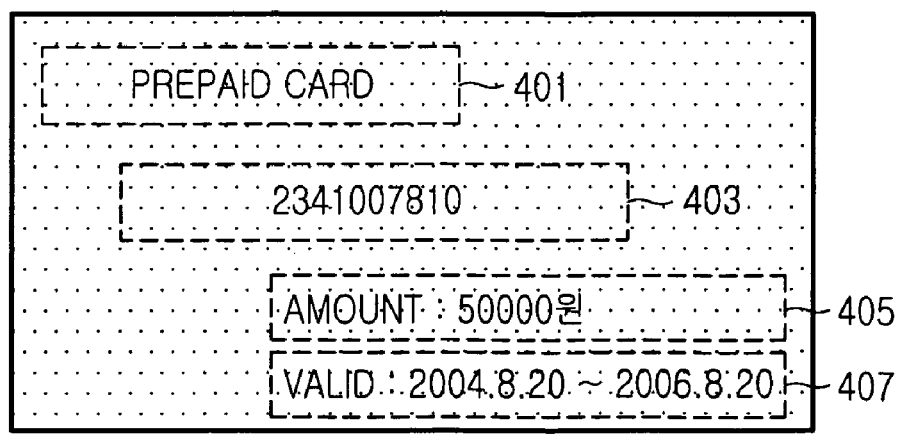
FIG. 4 is a plan view illustrating a prepaid card applied according to the embodiment of the present invention.

FIG. 2 is a flowchart illustrating an operation for storing the unique number of a prepaid card by character recognition according to the embodiment of the present invention and FIG. 4 is a view of the prepaid card. A conventional character recognition technique can be used to implement the embodiment of the present invention as described below. The conventional character recognition technique extracts the features of printed characters in the area of pattern recognition as an image processing technique. The geometrical features of characters and their background in an input image are extracted from meshes of a predetermined size, and the feature of each character is stored, for character recognition. An edit application program for recognizing the unique number of a prepaid card according to the embodiment of the present invention can store and display only the unique number written on the prepaid card through a user interface for allowing the user to edit character-recognized data.

Referring to FIGS. 2 and 4, when the user presses the character recognition mode key through the keypad 27 in an idle state, for a prepaid card phone service in step 201, the controller 10 detects the setting of a character recognition mode in step 203, enters the character recognition mode by controlling the memory 29 in step 205, and controls the display 80 to display a character recognition menu as illustrated in Table 1 below in step 207.

TABLE 1

| | Character recognition |
|---|---|
| 1 | Capture prepaid card |
| 2 | Capture printed text |
| 3 | Capture hand-written text |
| 4 | View captured character |

When the user selects the first menu item "capture prepaid card" in the above menu through the keypad 27 in step 209, the controller 10 photographs the prepaid card in the character recognition mode in step 211. Referring to FIG. 4, a card name 401, a prepaid card number 403, the amount of money on the card 405, and a validity period 407 are written on the prepaid card. The prepaid card number 403 is a 10 or more-digit number. For the prepaid card number 403, the amount of money 405 and the validity period 407 are registered. A service access number can further be registered to access a switching center for a domestic prepaid card phone service.

In step 211, the controller 10 extracts the geometrical features of the prepaid card number and its background from meshes of a predetermined size in a captured prepaid card image received at the video processor 70 through the camera and operates the edit application program to edit and store only the prepaid card number, by controlling the memory 29. The controller 10 controls the display 80 to display the prepaid card number in step 213. When the user presses an OK key in step 215, the controller 10 controls the memory 29 to store the prepaid card number in step 217.

Figure 3A:
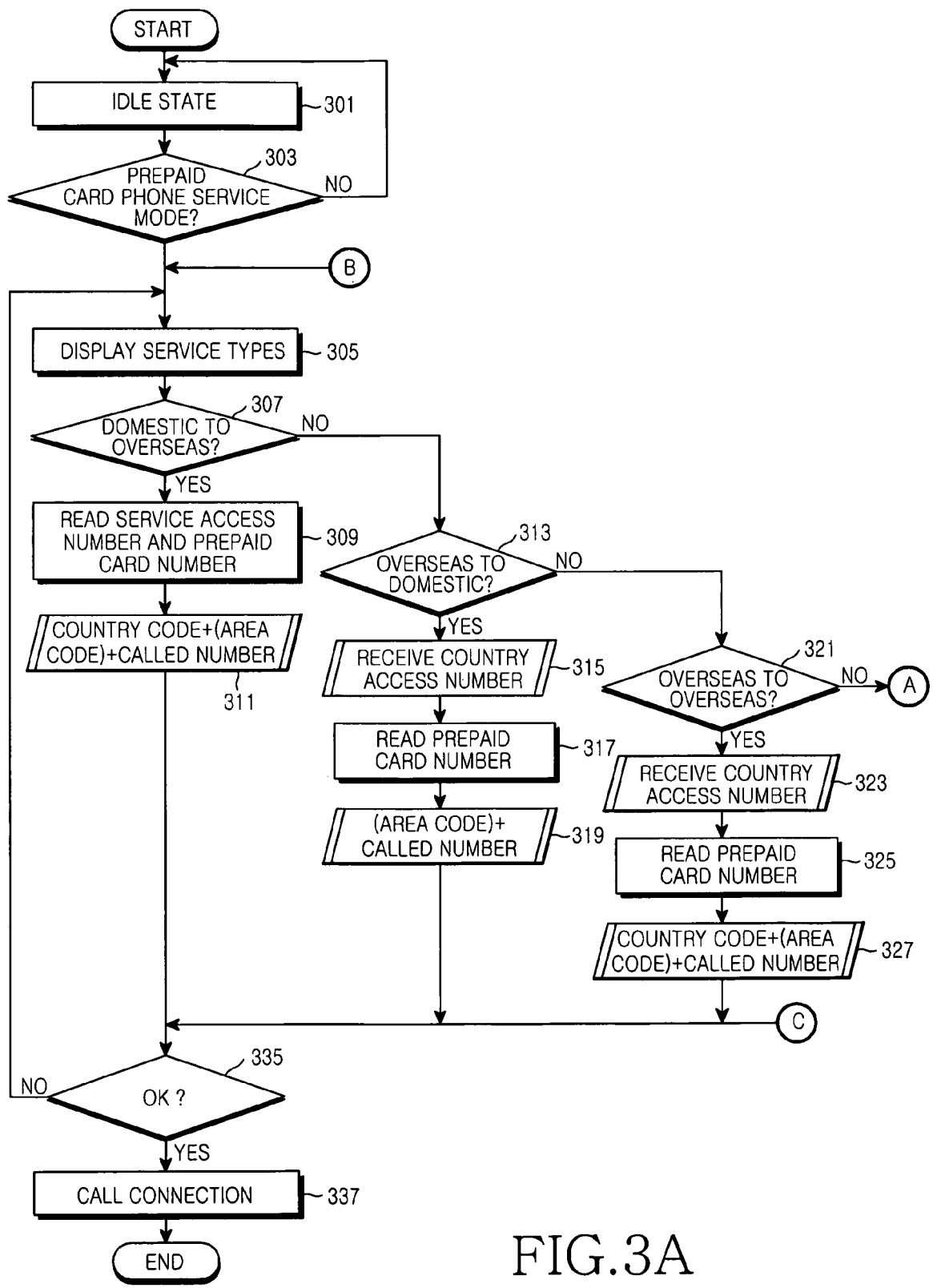
FIGS. 3A and 3B are flowcharts illustrating an operation for calling using a prepaid card according to an embodiment of the present invention.
Figure 3B:
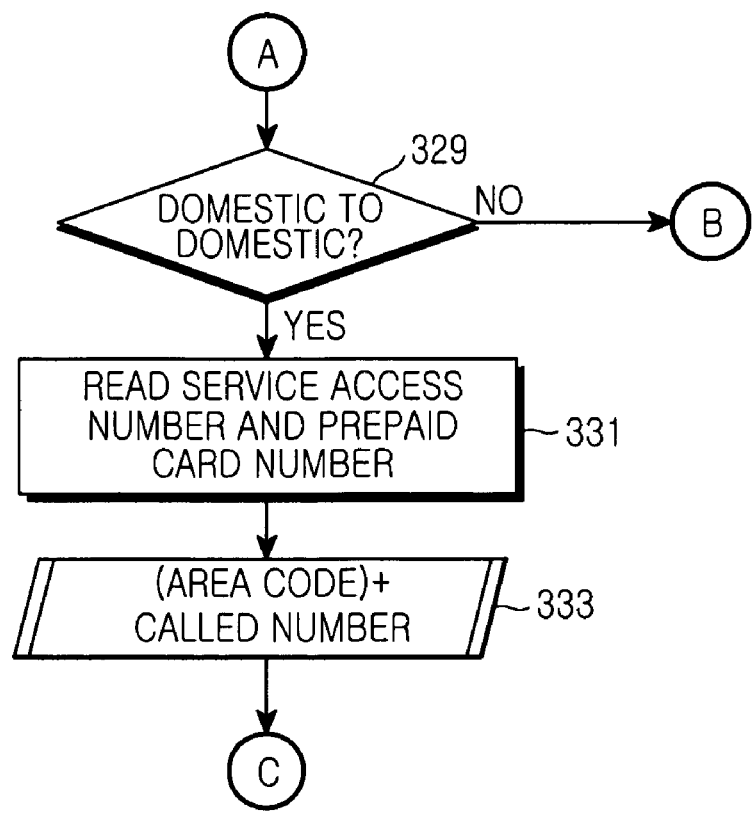

FIGS. 3A and 3B are flowcharts illustrating an operation for providing a prepaid card phone service according to the embodiment of the present invention.

Referring to FIGS. 3A and 3B, an idle state is entered into in step 301. When the user presses the prepaid card phone service mode key in step 303, the controller 10 enters a prepaid card phone service mode. In step 305, the controller 10 controls the memory 29 and the display 80 to display a call service type menu as illustrated in Table 2 below.

TABLE 2

| | Call service type |
|---|---|
| 1 | Domestic to Overseas Call |
| 2 | Overseas to Domestic Call |
| 3 | Overseas to Overseas Call |
| 4 | Domestic to Domestic Call |

If the user selects the first menu item "Domestic to Overseas Call" through the keypad 27 in the call service type menu in step 307, the controller 10 outputs and displays a predetermined service access number and the prepaid card number by controlling the memory 29 and awaits reception of a called number in step 309. When the user enters the called number through the keypad 27 in step 311, the controller 10 controls the display 80 to display the called number. The called number may include a country code and an area code, or a country code. As a way to enter the called number, the user enters a hot key number corresponding to the called number along with the service access number and the prepaid card number and then the called number is displayed. In the process of detecting the hot key number, a hot key number entering time T is counted and if T exceeds a predetermined threshold, the entered number is considered as the hot key number. If T is equal to or less than the threshold, the entered number can be considered as a mere digit. T refers to the duration for which the user presses a corresponding button at one time.

In the case of using a number table, when the user requests a number table menu through the keypad 27, a list of phone numbers is read and displayed. The number table can be a phone book. According to user selection in the number table menu, entries can be displayed by name, by number, by hot key number, by group, or in an order of the latest sent/received/absent call first. When the user selects the called number in the number table along with the service access number and the prepaid card number, the selected called number is displayed.

Or the user may enter the called number manually, along with the service access number and the prepaid card number, and then the selected called number is displayed.

If the user presses the OK key in step 335, the controller 10 dials the called number together with the service access number and the prepaid card number by controlling the memory 29 and connects a domestic to overseas call in step 337.

For example, if the user presses the prepaid card phone service mode key and selects a menu item "Domestic to Overseas Call" in the call service type menu, a service access number of 00721 and a prepaid card number of 2341007810 are displayed. A called number (country code+(area code)+number of the other party) is entered using a hot key number, a number table, or manually. The domestic to overseas call is then connected.

If the user selects the second menu item "Overseas to Domestic Call" in the call service type menu illustrated in Table 2 in step 313, the controller 10 controls the memory 29 to output country access numbers as illustrated in Table 3 in step 315.

TABLE 3

| Country Access Number | | |
| --- | --- | --- |
| Item number | Country | Access number |
| 1 | Guam | 1-888-865-8581 |
| 2 | Greece | 00-800-82-2111 |
| 3 | US | 1-800-822-8256 |
| 4 | Japan | 00539-821 |
| 5 | China | 108-823 |

When the user selects a country access number in the above country access number menu through the keypad 27 in step 315, the controller 10 controls the memory 29 and the display 80 to display the selected country access number. In step 317, the controller 10 controls the memory 29 and the display 80 to output the prepaid card number and awaits reception of a called number. If the user enters the called number through the keypad 27 in step 319, the controller 10 controls the displays 80 to display the called number. The called number may include an area code. As previously described, the called number can be entered using a hot key number, a number table like a phone book, or manually.

Upon input of the OK key from the user in step 335, the controller 10 dials the called number together with the country access number and the prepaid card number by controlling the memory 29 and connects an overseas to domestic call in step 337.

For example, if the user presses the prepaid card phone service mode key and selects a menu item "Overseas to Domestic Call" in the call service type menu, a country access number menu is displayed. If the user selects a country access number for China, the country access number 108-823 and the prepaid card number 2341007810 are displayed. A called number ((area code)+number of the other party) is entered using a hot key number, a number table, or manually. The overseas to domestic call is then connected.

If the user selects the third menu item "Overseas to Overseas Call" in the call service type menu illustrated in Table 2 in step 321, the controller 10 controls the memory 29 to output the country access numbers illustrated in Table 3. When the user selects a country access number in the above country access number menu through the keypad 27 in step 323, the controller 10 controls the memory 29 and the display 80 to display the selected country access number. In step 325, the controller 10 controls the memory 29 and the display 80 to output the prepaid card number and awaits reception of a called number. If the user enters the called number through the keypad 27 in step 327, the controller 10 controls the displays 80 to display the called number. The called number may include a country code and an area code, or an area code. As previously described, the called number can be entered using a hot key number, a number table like a phone book, or manually.

Upon input of the OK key from the user in step 335, the controller 10 dials the called number together with the country access number and the prepaid card number by controlling the memory 29 and connects an overseas to overseas call in step 337.

For example, if the user presses the prepaid card phone service mode key and selects a menu item "Overseas to Overseas Call" in the call service type menu, a country access number menu is displayed. If the user selects the country access number for China, the country access number 108-823 and the prepaid card number 2341007810 are displayed. A called number (country code+(area code)+number of the other party) is entered using a hot key number, a number table, or manually. The overseas to domestic call is then connected.

If the user selects the fourth menu item "Domestic to Domestic Call" in the call service type menu illustrated in Table 2 in step 329, the controller 10 controls the memory 29 to output the predetermined service access number and the prepaid card number and awaits reception of a called number in step 331. If the user enters the called number through the keypad 27 in step 333, the controller 10 controls the displays 80 to display the called number. The called number may include an area code. As described before, the called number can be entered using a hot key number, a number table like a phone book, or manually.

Upon input of the OK key from the user in step 335, the controller 10 dials the called number together with the service access number and the prepaid card number by controlling the memory 29 and connects a domestic to domestic call in step 337.

For example, if the user presses the prepaid card phone service mode key and selects a menu item "Domestic to Domestic Call" in the call service type menu, the service access number 00721 and the prepaid card number 2341007810 are displayed. A called number (country code+(area code)+number of the other party) is entered using a hot key number, a number table, or manually. The domestic to domestic call is then connected.

In accordance with the embodiment of the present invention as described above, for a prepaid card phone service, the unique number of a prepaid card is stored by character recognition through character photographing and a called number is entered using a hot key number or a number table like a phone book. Since a call is connected by a simple key manipulation, time consumption and inconvenience involved in pressing keys many times and hearing ARS voice in each stage are avoided, thereby increasing user convenience.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A method of providing a call service using a prepaid card in a portable terminal, the prepaid card displaying a unique prepaid card number to be entered during a telephone call upon request through an Automatic Response Service (ARS) from a switching center for proof of payment required for establishing a connection to a destination phone number, the method comprising the steps of:
   photographing the prepaid card according to a predetermined prepaid card capturing mode operation, recognizing the unique prepaid card number from the photographed image via character recognition, and storing the prepaid card number;
   receiving a phone number; and
   dialing the prepaid card number and the phone number.

2. The method of claim 1, wherein the step of recognizing and storing the prepaid card number comprises the steps of:
   extracting features of the prepaid card number and a background from meshes of a predetermined size; and
   editing only the prepaid card number by a prepaid card number recognition program and storing the prepaid card number.

3. The method of claim 1, wherein the prepaid card number includes information about an access number, the amount of money, and a validity period.

4. A method of providing a call service using a prepaid card in a portable terminal, the prepaid card displaying a unique prepaid card number to be entered during a telephone call upon request through an Automatic Response Service (ARS) from a switching center for proof of payment required for establishing a connection to a destination phone number, the method comprising the steps of:
   photographing the prepaid card according to a predetermined prepaid card capturing mode operation, recognizing a unique prepaid card number from the photographed image via character recognition, and storing the prepaid card number;
   outputting a service access number for a prepaid card phone service and the prepaid card number according to a prepaid card phone service operation, and awaiting reception of a phone number; and
   receiving the phone number and dialing the service access number, the prepaid card number, and the phone number.

5. The method of claim 4, wherein the prepaid card phone service provides call service types of "domestic to overseas call", "overseas to domestic call", "overseas to overseas call", and "domestic to domestic call".

6. The method of claim 4, wherein the phone number receiving step comprises the step of receiving the phone number by a hot key number, by a number table, or manually.

7. A method of providing a call service using a prepaid card in a portable terminal, the prepaid card displaying a unique prepaid card number to be entered during a telephone call upon request through an Automatic Response Service (ARS) from a switching center for proof of payment required for establishing a connection to a destination phone number, the method comprising the steps of:
   photographing the prepaid card according to a predetermined prepaid card capturing mode operation, recognizing a unique prepaid card number from the photographed image via character recognition, and storing the prepaid card number;
   entering a prepaid card phone service mode and displaying country access numbers according to a prepaid card phone service operation;
   outputting, upon selection of a country access number, the selected country access number and the prepaid card number, and awaiting reception of a phone number; and
   receiving the phone number and dialing the country access number, the prepaid card number, and the phone number.

8. The method of claim 7, wherein the prepaid card phone service provides call service types of "domestic to overseas call", "overseas to domestic call", "overseas to overseas call", and "domestic to domestic call".

9. The method of claim 7, wherein the phone number receiving step comprises the step of receiving the phone number by a hot key number, by a number table, or manually.

10. An apparatus for providing a call service using a prepaid card in a portable terminal, the prepaid card displaying a unique prepaid card number to be entered during a telephone call upon request through an Automatic Response Service (ARS) from a switching center for proof of payment required for establishing a connection to a destination phone number, the method comprising:
    a camera for photographing the prepaid card;
    a memory for storing prepaid card information;
    a controller for photographing the prepaid card according to a predetermined prepaid card capturing mode operation via the camera, recognizing a unique prepaid card number from the photographed image via character recognition, and storing the prepaid card number in the memory, receiving a phone number, and dialing the prepaid card number and the phone number.

11. The apparatus of claim 10, wherein the controller extracts features of the prepaid card number and a background from meshes of a predetermined size, and edits only the prepaid card number by a prepaid card number recognition program and stores the prepaid card number.

12. The apparatus of claim 10, wherein the prepaid card number includes information about an access number, the amount of money, and a validity period.

* * * * *